United States Patent [19]

Marshall

[11] Patent Number: 4,775,171

[45] Date of Patent: Oct. 4, 1988

[54] HIGH PRESSURE FIELD REPAIR COUPLING

[76] Inventor: Don J. Marshall, P.O. Box 159, Churchton, Md. 20733

[21] Appl. No.: 34,606

[22] Filed: Apr. 6, 1987

[51] Int. Cl.⁴ .......................................... F16L 17/04
[52] U.S. Cl. .................................. 285/101; 285/255
[58] Field of Search ............... 285/101, 106, 255, 149, 285/249, 243

[56]  References Cited
U.S. PATENT DOCUMENTS

| | | | |
|---|---|---|---|
| 2,485,976 | 10/1949 | Main | 285/106 |
| 2,940,778 | 6/1960 | Kaiser | 285/149 X |
| 3,097,866 | 7/1963 | Iversen | 285/101 X |
| 3,189,370 | 6/1965 | Marshall | 285/255 X |
| 3,222,091 | 12/1965 | Marshall | 285/243 X |

FOREIGN PATENT DOCUMENTS 786330  11/1957  United Kingdom ............... 285/101

Primary Examiner—Dave W. Arola

[57] ABSTRACT

A high pressure hose coupling having a body portion including a cylindrical cavity for acceptance of a piston and means for attachment of an outer ferrule having a conical interior surface; a free sliding inner nipple which carries on its outer periphery an annular piston operative within said cylindrical body cavity; a plurality of wedges; a wedge driving means operating to produce uniform movement of said nipple and wedges into said conical ferrule.

1 Claim, 1 Drawing Sheet

HIGH PRESSURE FIELD REPAIR COUPLING

SUMMARY OF THE INVENTION AND STATE OF PRIOR ART

The present invention relates to high pressure hose couplings of the type normally used in conjunction with large bore, steel wire reinforced hose, and, more specifically to an improved hose coupling which utilizes pressure of the entrained fluid to energize an integral hydraulic cylinder-piston arrangement to develop mechanical forces sufficient to complete the final assembly of this coupling to the hose, a task normally requiring a heavy hydraulic press, a tool rarely if ever available during field repairs.

Also, the continuing function of this hydraulic cylinder-piston means has the effect, in usage of the conduit system, of maintaining at all times a constant force driving the wedges ever more firmly against the wire mass of the hose carcass, creating a hose holding power far in excess of any hose coupling presently in use.

In all presently available couplings of this class, generally referred to as reusable, the force necessary for the inwardly constrictive movement of the wedges during assembly to the hose has been supplied by either heavy hydraulic pullers or a boltup means which considerably increases the outer diameter of the coupler, this impeding handling and storage, especially if the hose handling means includes reels.

Such couplings also require constant surveillance in use due to the fact that although they are sometimes referred to as "self tightening", this is in reference to the potential for retightening the bolts, which requires periodic check and retensioning, thus the term self tightening is misnomer, and should be termed "retightenable". (Reference, U.S. Pat. No. 3,189,370, granted to the present inventor.)

While such couplings are believed to have some slight degree of retensioning under the normal "blowoff" force, which is defined as the contained pressure in PPSI multiplied by the inner diameter of the base, this force cannot be accepted as fully operative. This is due to the fact that the usual nipple element is immoveable, and being "toothed", absorbs at least one-half of the available force. At the same time, in order to increase the constriction of the wedges into the hose carcass, the wedges must be moved axially rearward into the conical ferrule.

The remaining portion of the blowoff force transferred to the wedges by friction of the wedge teeth, if sufficient, create an immediate unequal stressing of the wire layers, the outer layers relieved of stress by the wedge movement, while the inner layers of wires are held in position by the nipple teeth.

This condition leads to an early failure of the wire mass, at a far lower level than calculable ultimate tensile strength.

An early attempt to eliminate this problem is seen in U.S. Pat. No. 3,222,091, also issued to the present inventor, in which a free-sliding nipple was taught. While this coupling was capable of retention of the hose to considerably higher pressures than any fixed nipple coupling of its class, when failure did occur, it was again evident that unequal wire loading was occurring, except in reverse of previous investigations. This was due to the fact that in this coupling, the inner, rather than the outer wire layers were relieved of stress. Its improved holding power was of course due to the availability of full blowoff force, this provided by the sliding nipple principle.

Faced by todays demand for constantly greater volume of fluid transport conduit, at ever increasing delivery pressures, it has become evident that a coupling means capable of utilization of the total tensile value of the reinforcing wires in an imperative.

In view of the larger hose diameters and greater pressure levels, it is obvious that the internal stresses on the hose carcass itself will lead to increase of hose failures, particulary in military usage, where rapid repair under rigorous conditions is the rule rather than exception, that a coupling means providing ultimate holding power and ease of repair without heavy tooling must be provided.

It is therefore a first object to provide such coupling means wherein the heavy forces necessary to correct field assembly are developed within the structure of the coupler.

A second object is provision of a coupling means capable of attainment and maintenance of equality of loading of the layered wire mass within the hose carcass under all circumstances of use.

Yet another object is to provide such a coupling means in which the force developed within and by its novel structure biasing toward self-tightening will be increased considerably above that of normal blow-off force.

Still another object is the provision of such coupling means in which this magnified force will be applied equally to both the wedge and the nipple portion of such coupling means.

Another object is provision of such coupling means wherein all constrictive forces are delivered at a perpendicular angle to the hose wall under any and all assembly or usage conditions.

These and other objectives, and a more complete understanding of the invention may be had by reference to the following specification and claims made in conjunction with the following drawings.

DESCRIPTION OF THE DRAWINGS

Referring now to FIG. 1, 1 is a body portion constructed in accordance with the teaching of this invention, 1-$a$ being the cylinder bored area, 1-$b$ being a retaining groove for acceptance of the lockring, 1-$c$ is an annular abutting surface for axial positioning of the wedges, 1-$d$ is a receiver portion for attachment of the invention to extraneous mating parts of the conduit system, for which may be substituted other attachment means such a flanges, pipe threads, etc.

2 is the free floating nipple, 2-$a$ is the piston face on which conduit system pressure operates, 2-$b$ are receiving grooves for acceptance and deformation of the wire mass of the hose carcass, 2-c is a piston seal gland, 2-d is a seal gland accepting a seal against system leakage.

3 is a wedge driving ring, cooperative with the rear face of the piston and the forward face of the wedges.

4 is one of a plurality of wedges, 4-a being the conical outer surface, 4-b are heavy wire depressing teeth, 4-c are minor sealing teeth.

5 is the outer ferrule, 5-a is a lockring accepting groove, 5-b a seal accepting groove, 5-c is an annular shoulder cooperative with a common mechanic's gear puller during initial assembly.

6 is a lockring.

7, 8, and 9 are seal rings.

10 is a representative hose, 10-a being the outer cover, 10-b the wire-mass, and 10-c the inner liner thereof.

Figure 1:
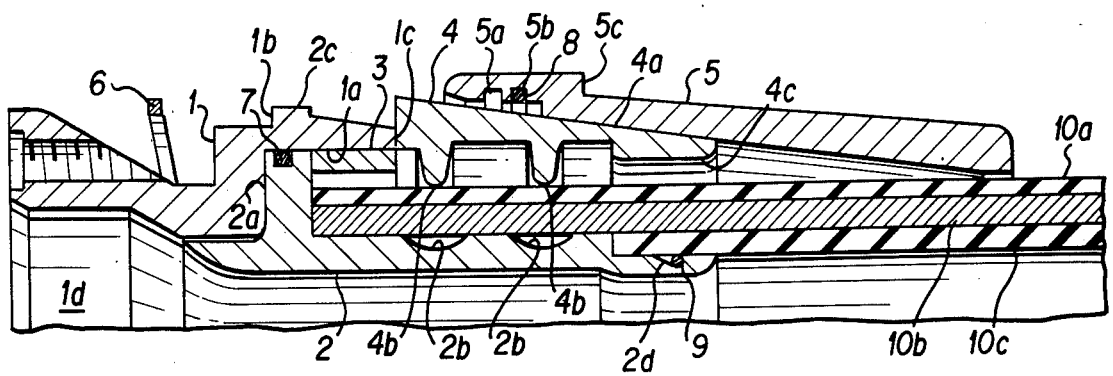
FIG. 1 is a side sectional view of this invention taken above the axial centerline, showing the positioning of the various parts thereof in relation to the hose and each other at first loose hand assembly.

In accordance with the invention, particularly the requirement for ease of field assembly, it is seen in FIG. 1 that at this stage of assembly, there is zero deformation of the hose carcass, therefore zero energy required. Note that the position of the wedge teeth 4-b is in true axial register with the hose wire accepting grooves, 2-b, controlled by the abutting annular surface 1-c of the body, 1.

Figure 2:
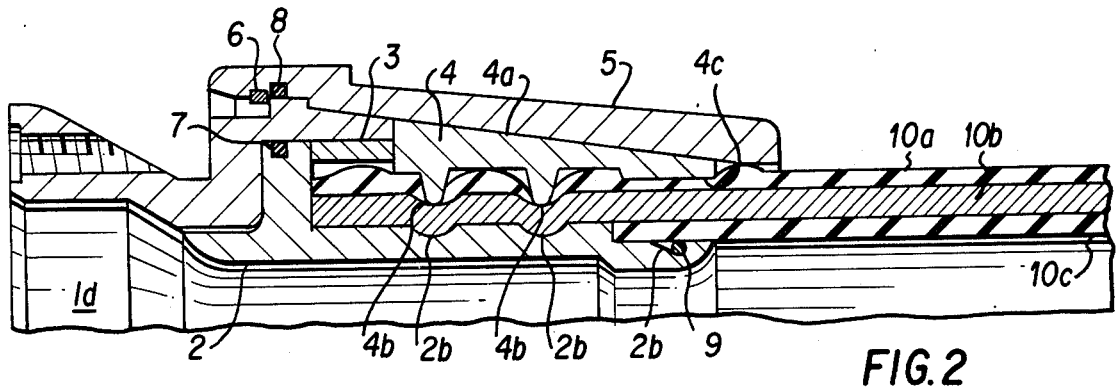
FIG. 2 is a side sectional view of the invention taken below the axial centerline, showing the changing relationship of the various parts as the ferrule is drawn forward to its position of attachment to the body, and showing the partial penetration of the wedge teeth.

Referring now to FIG. 2, see illustrated the relative position of the various parts after the ferrule has been drawn into position and the lockring, 6, has been installed.

This is accomplished by use of small hand tools, such as a three arm gear puller, not shown, which operates by placement of a plate or bar across the mouth of the receiver, 1-d, exerting its force against the shoulder of the ferrule, 5-c, and removed after the lockring 6, is snapped into its receiving groove, 1-b.

At this stage of assembly, note that the wire mass has been deformed to a slight degree into the receiving grooves of the nipple, 2-b, by pressure exerted by the wedge teeth, 4-b but that no extreme forces are needed for this purpose.

Figure 3:
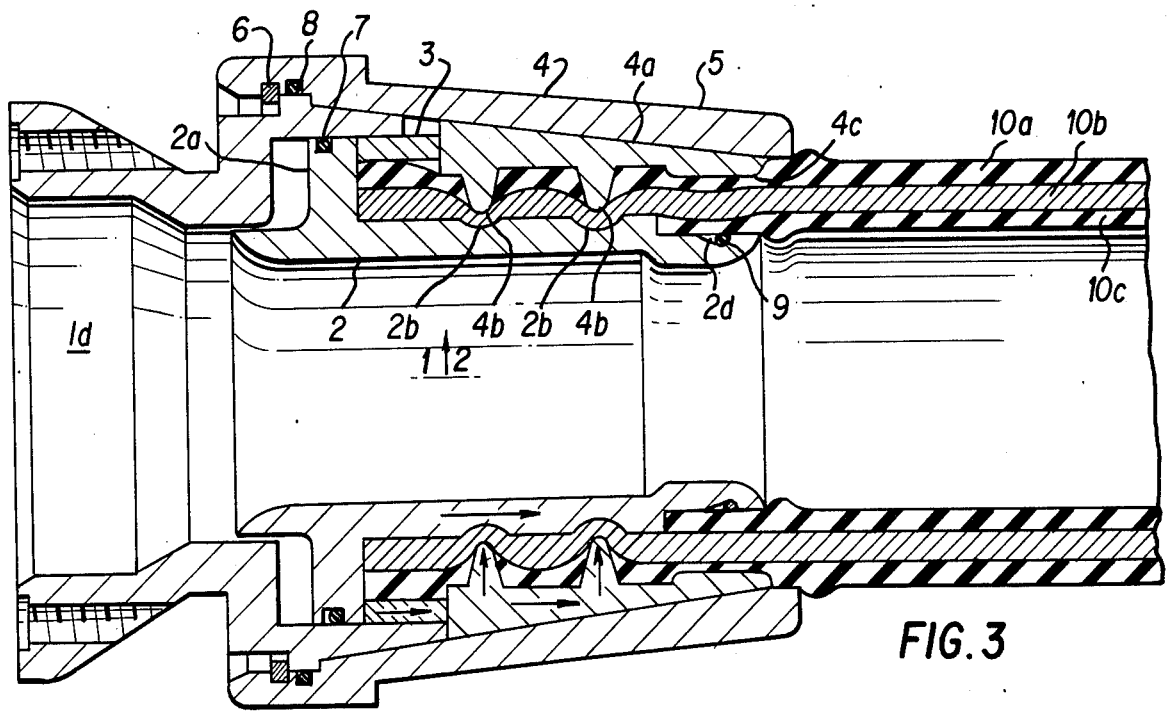
FIG. 3 is a side sectional view of the invention illustrating the axial movement of the nipple and wedges occurring at first application of fluid pressure of the conduit system, causing full tooth penetration and lock-on of coupler to the wire mass of the hose.

Referring now to FIG. 3, which is a side sectional view of the entire completed assembly after conduit system pressurization, note that the floating nipple, 2, has been driven rearward by the action of pressure on the piston face 2-a, in cooperation with normal blowoff forces, and that the wedge teeth are now in full metal-to-metal contact with the hose wire mass. Note also the function of the wedge driving ring, 3, which insures simultaneous and equal axial movement of both the wedges and the nipple, as is shown by arrows depicting relative movement in the lower half of this drawing.

Note that as the nipple, 2, and the wedges, 4, move in precise axial relationship, that all movement of the wedge caused by the diminishing interior conical surface of the ferrule, 5, is in exact perpendicularity to the hose carcass, thus eliminating any abnormal shear forces, and due to this perpendicularity of approach, eliminates entirely any unequal load on the successive layers of the wire mass.

For better understanding of the greatly increased hose gripping power of this invention, an examination of the forces involved should be made.

As before stated, the entire self tightening force of previous state-of-the-art coupling devices is derived from hose blowoff alone. This, as has been seen, is diminished by approximately one-half by function of the fixed nipple type coupler, resulting in serious inequality of tension between wire layers; in the inventors previous teaching, and uncontrolled free sliding nipple, a larger percentile of the available force is usable, but, at point of wedge gall against the ferrule inner surface, unequal wire load still occurs at lower than calculated wire ultimate tensile strength, due to continuous travel potential of the nipple.

Assessing the available force due to blowoff effect, we find this in for example a six inch diameter hose, to be area in square inches times the proof pressure of the conduit. The area being 36 inches, the proof pressure being 2200 pounds per square inch, we find a total available force of only 79,200 pounds, which in the case of the commonly used fixed nipple, finds only about 40,000 pounds remaining for the rearward movement of the wedges.

The device of this invention, in its application to six inch ID hose, has a piston diameter of 8.75 inches, an area of 76.56 inches. Multiplying this by the proof pressure, we see a force of 168,432 pounds available, all of which is utilized in the rearward biasing of the nipple and wedges into the diminishing cone of the ferrule and hence into constrictive effort.

It is especially important to here note that the wedge driving ring, 3, now serves to prevent axial movement of the nipple, 2, in reference to the wedges, 4, thus preventing during actual usage, the occurrence of any tangential shear forces which lead to unequal wire layer loadings.

It is apparent that while developing approximately four times the hose gripping force, that this invention at the same time eliminates all of the destructive unequal wire loadings and shear forces present in all known couplings of this class.

It is equally apparent that as greatly increased constrictive forces are developed by its novel internal construction, that it is ideally suited for field repair of damaged conduit. This is especially important when it is known that in some instances, such repairs may be performed far from any source of energy other than naked manpower, from arid desert to ocean floor.

What is claimed:

1. A hose coupling for attachment to and sealing of the terminal end of high pressure large bore hose of layered construction, such hose having an intermediate layer of heavy wire reeinforcement, and an inner and outer layer of elastomeric material, such coupling comprising:

a tubular body portion having at its forward end means for attachment to a desired standard piping fitting, on its outer periphery an annular flange cooperative with a sealing ring and for abutment with a locking ring, a conical rearward facing tubular portion terminating in an abutment face; on its inner periphery a minor bore for acceptance and centering of a nipple portion, and a major bore for acceptance of an annular piston portion of the nipple, a nipple portion insertable into the hose end after removal of a length of the inner liner, having on its outer periphery a forward facing extension loosely fitting into the minor bore of said body, an annular piston and sealing ring cooperative with the major bore of said body, a heavy walled central portion having a plurality of grooves for the acceptance and retention of the hose wire layer, and a rearwardly facing extension having a sealing ring on its outer surface, of a diameter to be insertable into the elastomeric inner liner of the hose, a plurality of wedge segments, having an outer periphery with a conical surface for cooperation with a like conical surface said wedge segments having a inner periphery of a ferrule, on the forward face formed as a surface for abutting said abutment face of said tubular body portion for control of initial wedge position and for cooperation with a wedge driving ring; on the inner surface a plurality of annular teeth, so spaced as to be in axial register with the grooves of the said nipple, and a rear portion having means for depression of the hose wall radially inward against the seal ring of said nipple, a wedge driving ring cooperative between the rearward face of the said annular piston and the forward face of said wedge segments to insure uniform axial movement of said wedge segments in response to axial movement of said nipple, a ferrule portion having on its inner periphery a conical surface cooperative with said wedge segments to convert relative axial motion therebetween to a radially inward movement of said segments when said ferrule is moved over said annular flange to a lockring receiving position, thereby depressing said reinforcing wire layer into said grooves, and the hose wall against said seal ring of the nipple, and, fluid pressure acting on said annular piston moves said wedge driving ring and wedge segments relative to said ferrule position thereby additionally depressing said reinforcing wires into said grooves and hose wall more forcefully against said sealing ring, a seal groove containing a seal ring for sealing engagement with said annular flange and a second groove containing a lockring for locking said ferrule relative to said annular flange by abutment therewith and, on its outer periphery an annular shoulder for attachment of assembly tooling.

* * * * *